(12) United States Patent  (10) Patent No.: US 8,815,122 B2
Nakamura et al.  (45) Date of Patent: Aug. 26, 2014

(54) POLYCRYSTALLINE SCINTILLATOR FOR DETECTING SOFT X-RAYS

(75) Inventors: Ryouhei Nakamura, Mishima-gun (JP); Kenya Tanaka, Mishima-gun (JP); Shunsuke Ueda, Mishima-gun (JP)

(73) Assignee: Hitachi Metals, Ltd., Tokyo (JP)

( * ) Notice: Subject to any disclaimer, the term of this patent is extended or adjusted under 35 U.S.C. 154(b) by 133 days.

(21) Appl. No.: 13/695,725

(22) PCT Filed: Oct. 25, 2011

(86) PCT No.: PCT/JP2011/074544
§ 371 (c)(1), (2), (4) Date: Nov. 1, 2012

(87) PCT Pub. No.: WO2012/057133
PCT Pub. Date: May 3, 2012

(65) Prior Publication Data
US 2013/0043430 A1  Feb. 21, 2013

(30) Foreign Application Priority Data
Oct. 29, 2010  (JP) ................................. 2010-243521

(51) Int. Cl.
*C09K 11/08* (2006.01)
*C09K 11/77* (2006.01)

(52) U.S. Cl.
USPC ............................. 252/301.4 F; 252/301.4 R

(58) Field of Classification Search
CPC ........... C09K 11/7774; C09K 11/7721; C09K 11/025; C09K 11/7706; C09K 11/7715; C09K 11/7766; G21K 4/00; G21K 2004/06; G01T 1/20

USPC ..... 252/301.4 F, 301.4 R; 250/361 R, 370.11, 250/458.1, 183.1; 264/681
See application file for complete search history.

(56) References Cited

U.S. PATENT DOCUMENTS 6,458,295 B1  10/2002  Yamada et al.
8,377,335 B2 *  2/2013  Fukuta et al. .......... 252/301.4 H
2002/0013215 A1  1/2002  Nakamura
(Continued)

FOREIGN PATENT DOCUMENTS

JP  2001-4753 A  1/2001
JP  2001-183463 A  7/2001
(Continued)

OTHER PUBLICATIONS

International Search Report for PCT/JP2011/074544 dated Jan. 31, 2012.

*Primary Examiner* — Carol M Koslow
*Assistant Examiner* — Lynne Edmondson
(74) *Attorney, Agent, or Firm* — Sughrue Mion, PLLC

(57) ABSTRACT

A polycrystalline scintillator for detecting soft X-rays, which comprises Ce as a light-emitting element and at least Y, Gd, Al, Ga and O, and has a garnet crystal structure, and a composition represented by the general formula of $(Y_{1-x-z}Gd_xCe_z)_{3+a}(Al_{1-u}Ga_u)_{5-a}O_{12}$, wherein $0 \leq a \leq 0.1$, $0.15 \leq x \leq 0.3$, $0.002 \leq z \leq 0.015$, and $0.35 \leq u \leq 0.55$, with 0.05-1 ppm by mass of Fe and 0.5-10 ppm by mass of Si by outer percentage, a ratio $\mu_{50}/\mu_{100}$ of 3 or more, wherein $\mu_{50}$ is an absorption coefficient of X-rays at 50 keV, and $\mu_{100}$ is an absorption coefficient of X-rays at 100 keV, and afterglow of 800 ppm or less after 3 ms from the termination of X-ray irradiation.

12 Claims, 6 Drawing Sheets

(56) References Cited

U.S. PATENT DOCUMENTS

| | | | |
|---|---|---|---|
| 2003/0141484 A1 | 7/2003 | Yamada et al. | |
| 2004/0066883 A1 | 4/2004 | Kanai et al. | |
| 2008/0017802 A1 | 1/2008 | Nakamura et al. | |
| 2009/0261255 A1 | 10/2009 | Nakamura et al. | |
| 2010/0187423 A1* | 7/2010 | Nakamura et al. | 250/361 R |
| 2010/0220833 A1 | 9/2010 | Levene et al. | |

FOREIGN PATENT DOCUMENTS

| | | |
|---|---|---|
| JP | 2001-294853 A | 10/2001 |
| JP | 2001-303048 A | 10/2001 |
| JP | 2001-348273 A | 12/2001 |
| JP | 2002-189080 A | 7/2002 |
| JP | 2003-119070 A | 4/2003 |
| JP | 2004-47196 A | 2/2004 |
| JP | 2005-105177 A | 4/2005 |
| JP | 2007-145902 A | 6/2007 |
| JP | 3938470 B2 | 6/2007 |
| JP | 2007-246653 A | 9/2007 |
| JP | 2008-538966 A | 11/2008 |
| JP | 2009-235181 A | 10/2009 |
| WO | 99/33934 A1 | 7/1999 |
| WO | 2006/068130 A1 | 6/2006 |
| WO | 2008/093869 A1 | 8/2008 |
| WO | WO 2008093869 A1 * | 8/2008 |

* cited by examiner

POLYCRYSTALLINE SCINTILLATOR FOR DETECTING SOFT X-RAYS

CROSS REFERENCE TO RELATED APPLICATIONS

This application is a National Stage of International Application No. PCT/JP2011/074544 filed Oct. 25, 2011, claiming priority based on Japanese Patent Application No. 2010-243521 filed Oct. 29, 2010, the contents of all of which are incorporated herein by reference in their entirety.

FIELD OF THE INVENTION

The present invention relates to a polycrystalline scintillator for detecting soft X-rays, which has a large absorption coefficient of soft X-rays and a small absorption coefficient of hard X-rays, thereby having a large emission intensity and small afterglow.

BACKGROUND OF THE INVENTION

An X-ray computed tomography (CT) apparatus comprises an X-ray tube radiating fan-beam X-rays, and an X-ray detector comprising a large number of aligned devices for detecting fan-beam X-rays, detecting fan-beam X-rays with different angles in each cross section, and analyzing the resultant X-ray absorption data by a computer to calculate X-ray absorbance at each position in each cross section, thereby forming an image in each cross section.

An X-ray detector practically used is a combination of a scintillator of a single-crystal $CdWO_4$ ceramic, a ceramic having a composition of $(Y, Gd)_2O_3$:Eu, Pr, a ceramic having a composition of $Gd_2O_2S$:Pr, Ce, F (hereinafter referred to as "GOS:Pr"), etc., and a silicon photodiode. In the X-ray detector, the scintillator absorbs X-rays to emit light, which is detected by the silicon photodiode. The scintillator emits light having a wavelength corresponding to an energy level of a light-emitting element (for example, Pr in $Gd_2O_2S$:Pr, Ce, F) in the matrix (for example, $Gd_2O_2S$ in $Gd_2O_2S$:Pr, Ce, F). When this wavelength is 500 nm or more corresponding to the visible light, the silicon photodiode has good detection efficiency, providing the X-ray detector with high sensitivity.

The scintillator is required to have such properties as high material uniformity, small unevenness of X-ray characteristics, little deterioration by radiation, small changes of light emission characteristics by environment changes such as temperature variations, etc., good machinability, little deterioration by working, no moisture absorption and no deliquescence, chemical stability, etc.

In the X-ray CT apparatus, the X-ray detection device should be small for improved resolution, and the scanning time should be short to reduce exposure to X-rays and the influence of the body motion. As a result, the amount of X-rays received by each X-ray detection device decreases, so that the X-ray detection device should have high emission efficiency (large emission intensity). Further, to improve the time resolution of the X-ray detection device, emission (afterglow) after the termination of the irradiation of X-rays should be as short as possible. The afterglow is expressed by a ratio of emission intensity after a predetermined period of time from the termination of the irradiation of X-rays to emission intensity during the irradiation of X-rays.

With respect to various scintillators put into practical use at present, their emission intensities and afterglow after 3 ms and 300 ms are shown in Table 1. Using a W target as an X-ray target with no X-ray filter, the emission intensity and the afterglow are measured by irradiating X-rays (containing both soft X-rays and hard X-rays) obtained at tube voltage of 120 kV and tube current of 20 mA to an X-ray detection device comprising a scintillator and a silicon photodiode (S2281 available from Hamamatsu Photonics K. K.). The emission intensity is a relative value (%) when the emission intensity of GOS:Pr, Ce, F is 100%. The afterglow is a relative value (ppm) to emission intensity during the irradiation of X-rays.

TABLE 1

| Composition | Crystal Structure | Density (g/cm³) | Emission Intensity (%) | Afterglow (ppm) After 3 ms | Afterglow (ppm) After 300 ms |
|---|---|---|---|---|---|
| $CdWO_4$ | Single Crystal | 7.99 | 56 | 500 | 5 |
| $Gd_2O_2S$:Pr, Ce, F | Polycrystalline | 7.28 | 100 | 300 | 10 |
| $(Y, Gd)_2O_3$:Eu, Pr | Polycrystalline | 5.92 | 100 | 30,000 | 10 |
| $Gd_3Ga_5O_{12}$:Cr, Ce | Polycrystalline | 7.09 | 72 | 1,000 | 50 |
| $Gd_3Al_3Ga_2O_{12}$:Ce | Polycrystalline | 6.46 | 95 | 1,000 | 50 |

Among the above scintillators, a polycrystalline ceramic of $Gd_3Al_3Ga_2O_{12}$:Ce (hereinafter referred to as "GGAG:Ce") comprising gadolinium oxide, gallium oxide, aluminum oxide and cerium oxide as main components and having a garnet structure has a large emission intensity, because light emission occurs by the transition of $Ce^{3+}$, an light-emitting element, from a 5 d level to a 4 f level. It also has a small decay time constant, which is a time period until emission intensity becomes 1/e of the emission intensity during the irradiation of X-rays after the termination of the irradiation of X-rays.

JP 2001-4753 A discloses an phosphorescent oxide as a ceramic scintillator, which is an oxide having a garnet structure comprising at least Gd, Ce, Al, Ga and O, an atomic ratio of Gd/(Al+Ga+Gd) being 0.33-0.42, the amount of other phases other than the garnet structure being less than 2.0% by weight, the relative density being 99.0% or more, the diffuse transmittance being 50.0% or more, a main peak of the light emission spectrum being near 550 nm, and afterglow after 30 ms from turning off the exciting light being $10^{-3}$ or less. However, because the phosphorescent oxide of JP 2001-4753 A contains Gd as a main component but does not contain Y, it is not suitable for scintillators for detecting soft X-rays.

JP 2003-119070 A discloses a fluorescent device formed by a matrix crystal with a garnet structure comprising Ce as a light-emitting element and at least Gd, Al, Ga and O, which has an absorption coefficient μ of 0.6 $mm^{-1}$ or less to light having a wavelength of 550 nm, a relative density of 99.8% or more, and an average crystal grain size of 4 μm or more. However, because the phosphorescent oxide of JP 2003-119070 A contains Gd as a main component but does not contain Y, it is not suitable for scintillators for detecting soft X-rays.

Japanese Patent 3938470 discloses a fluorescent body as a ceramic scintillator for a radiation detector, which has a composition comprising cerium as a light-emitting component and represented by the general formula of $(Gd_{1-z-x}L_zCe_x)_3Al_{5-y}Ga_yO_{12}$, wherein L represents La or Y, z is in a range of $0<z<0.2$, x is in a range of $0.0005 \leq x \leq 0.015$, and y is in a range of $0<y<5$, and which is obtained by the compression-molding of starting material powders and sintering. Japanese Patent 3938470 describes that though part of gadolinium Gd may be substituted by yttrium Y, a larger amount of Y lowers the light emission efficiency and the X-ray stopping power, so that the amount (z) of Y is less than 0.2. Because the fluorescent body of Japanese Patent 3938470 contains Y in as small an amount as less than 0.2 by atomic ratio if any, it is not suitable for scintillators for detecting soft X-rays.

JP 2002-189080 A discloses a phosphorescent oxide with a garnet structure as a ceramic scintillator, which comprises at least Gd, Ce, Al, Ga and O, an atomic ratio of (Gd+Ce)/(Al+Ga+Gd+Ce) being more than 0.375 and 0.44 or less, an atomic ratio of Ce/(Ce+Gd) being 0.0005-0.02, and an atomic ratio of Ga/(Al+Ga) being more than 0 and less than 1.0. However, because the phosphorescent oxide of JP 2002-189080 A contains Gd as a main component but does not contain Y, it is not suitable for scintillators for detecting soft X-rays.

JP 2001-303048 A discloses a fluorescent body as a ceramic scintillator, which is represented by the general formula of $(Gd_{1-x-y-z}L_xCe_ySc_z)_3Al_{5-d}Ga_dO_{12}$, wherein L represents La or Y, x is in a range of $0 \le x \le 0.2$, y is in a range of $0.0005 \le y \le 0.02$, z is in a range of $0 \le z \le 0.03$, and d is in a range of $0 < d < 5$. JP 2001-303048 A describes that part of gadolinium Gd may be substituted by yttrium Y, a larger amount of Y lowers the light emission efficiency and the X-ray stopping power, so that the amount (x) of Y is less than 0.2. Because the fluorescent body of JP 2001-303048 A contains Y in as small an amount as less than 0.2 by atomic ratio if any, it is not suitable for scintillators for detecting soft X-rays.

JP 2001-294853 A discloses a phosphorescent oxide as a ceramic scintillator, which comprises Gd, Al, Ga and O as main elements, and Ce as a light-emitting component, 1 mol of the phosphorescent oxide containing more than 0.001 mol and less than 5.0 mol of a compound of at least one element of Groups Ia, IIa, IVb and VIIb in the Long Form Periodic Table. This phosphorescent oxide has a diffuse transmittance of 60.0% or more, X-ray sensitivity 1.8 times or more that of $CdWO_4$, and afterglow of $5 \times 10^{-5}$ or less after 300 ms from excitement. However, because the phosphorescent oxide of JP 2001-294853 A contains Gd as a main component but does not contain Y, it is not suitable for scintillators for detecting soft X-rays.

JP 2001-183463 A discloses an oxide scintillator with a garnet-type crystal structure, which has a composition represented by the general formula of $(Gd_{1-x}Ce_x)_3Al_{5-y}Ga_yO_{12}$, wherein x is in a range of $0.0005 \le x \le 0.02$, and y is in a range of $0 < y < 5$, K or Si being less than 100 ppm by weight, and B being less than 100 ppm by weight. However, because the oxide scintillator of JP 2001-183463 A contains Gd as a main component but does not contain Y, it is not suitable for scintillators for detecting soft X-rays.

JP 2007-145902 A discloses a phosphorescent oxide comprising Ce as a light-emitting element and at least Gd, Al, Ga and O, and mainly having a garnet-type matrix crystal structure, which further contains Na. However, because the phosphorescent oxide of JP 2007-145902 A contains Gd as a main component but does not contain Y, it is not suitable for scintillators for detecting soft X-rays.

JP 2001-348273 A discloses a ceramic having a composition represented by the general formula of $Gd_{3-x}Ce_xAl_{y-}Si_zGa_{5-y-z}O_{12}$, wherein $0.001 \le x \le 0.05$, $1 \le y \le 4$, and $0.0015 \le z \le 0.03$. However, because the ceramic of JP 2001-348273 A contains Gd as a main component but does not contain Y, it is not suitable for scintillators for detecting soft X-rays.

WO 2006/068130 A discloses a phosphorescent material with a garnet structure comprising Ce as a light-emitting element and at least Gd, Al, Ga, O, and Lu and/or Y, and having a composition represented by the general formula(II) of $(Gd_{1-x-z}L_xCe_z)_{3+a}(Al_{1-u}Ga_u)_{5-a}O_{12}$, wherein L is Lu and/or Y, $0 < a \le 0.15$, $0 < x < 1.0$ ($0.2 \le x \le 0.67$, when L is Y), $0.0003 \le z \le 0.0167$, $x+z<1.0$, and $0.2 \le u \le 0.6$. However, WO 2006/068130 A does not disclose the use of the phosphorescent material for scintillators for soft X-rays.

WO 2008/093869 A discloses a phosphorescent material with a garnet structure comprising Ce as a light-emitting element and at least Gd, Al, Ga, O, and Lu and/or Y, and having a composition represented by the general formula of $(Gd_{1-x-z}L_xCe_z)_{3+a}(Al_{1-u}Ga_u)_{5-a}O_{12}$, wherein L is Lu and/or Y, $0 < a \le 0.15$, $0 < x < 1.0$, $0.0003 \le z \le 0.0167$, $x+z<1.0$, and $0.2 \le u \le 0.6$, Fe/Ce being 3% by weight or less. However, WO 2008/093869 A does not disclose the use of the phosphorescent material for scintillators for soft X-rays.

Demand is recently mounting to form a clear image of different-density tissues of a human body by X-ray CT. Among the human body tissues, low-density tissues such as muscles, blood vessels, etc. have large absorption coefficients of soft X-rays and small absorption coefficients of hard X-rays, while high-density tissues such as bones, etc. have large absorption coefficients for both soft X-rays and hard X-rays. Thus proposed is a method for imaging different-density tissues separately, using an X-ray detection device comprising scintillators 2 having a large absorption coefficient of soft X-rays and a small absorption coefficient of hard X-rays on an upper side, scintillators 3 having large absorption coefficients for both soft X-rays and hard X-rays on a lower side, silicon photodiodes 4 each arranged on the side of each scintillator 2, 3, light-reflecting members 5 covering both upper and side surfaces of each scintillator 2, 3, and a circuit board 6 below the scintillators 3 for hard X-rays as shown in FIG. 1 (JP 2008-538966 A). The upper-side scintillators 2 form an image of low-density tissues in a human body, and the lower-side scintillators 3 emit light by X-rays passing through the upper-side scintillators 2 to form an image of high-density tissues in a human body.

Known as scintillators having large absorption coefficients of soft X-rays and small absorption coefficients of hard X-rays are YAG:Ce and ZnSe(Te). However, YAG:Ce does not have a sufficiently large X-ray emission intensity, and ZnSe(Te) suffers extremely large unevenness of characteristics, toxicity, and expensiveness, despite excellent emission intensity and afterglow characteristics.

OBJECT OF THE INVENTION

Accordingly, an object of the present invention is to provide a polycrystalline scintillator for detecting soft X-rays, which has a large absorption coefficient of soft X-rays and a small absorption coefficient of hard X-rays for suitably imaging the low-density tissues of a human body, thus having a large emission intensity and small afterglow.

SUMMARY OF THE INVENTION

The polycrystalline scintillator for detecting soft X-rays according to the present invention comprises Ce as a light-emitting element and at least Y, Gd, Al, Ga and O, and has a garnet crystal structure, a composition represented by the following general formula:

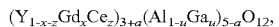

wherein $0 \le a \le 0.1$, $0.15 \le x \le 0.3$, $0.002 \le z \le 0.015$, and $0.35 \le u \le 0.55$, with 0.05-1 ppm by mass of Fe and 0.5-10 ppm by mass of Si by outer percentage; a ratio $\mu_{50}/\mu_{100}$ of 3 or more, wherein $\mu_{50}$ is an absorption coefficient of X-rays at 50 keV, and $\mu_{100}$ is an absorption coefficient of X-rays at 100 keV, and afterglow of 800 ppm or less after 3 ms from the termination of X-ray irradiation.

In the above polycrystalline scintillator for detecting soft X-rays, a in the general formula is preferably 0.005-0.05.

The polycrystalline scintillator for detecting soft X-rays according to the present invention comprises Ce as a light-emitting element and at least Y, Gd, Al, Ga and O, and has a garnet crystal structure, the amount of each element being 23.6-33.1% by mass of Y, 9.5-19.8% by mass of Gd, 0.11-0.92% by mass of Ce, 7.6-12.5% by mass of Al, 16.2-25.8% by mass of Ga, and 24.6-27.5% by mass of O, based on 100% by mass of the total amount, with 0.05-1 ppm by mass of Fe and 0.5-10 ppm by mass of Si by outer percentage; the scintillator having a ratio $\mu_{50}/\mu_{100}$ of 3 or more, wherein $\mu_{50}$ is an absorption coefficient of X-rays at 50 keV, and $\mu_{100}$ is an absorption coefficient of X-rays at 100 keV, and afterglow of 800 ppm or less after 3 ms from the termination of X-ray irradiation.

In the above polycrystalline scintillator for detecting soft X-rays, the preferred amount of each element is 23.6-32.7% by mass of Y, 9.5-19.6% by mass of Gd, 0.11-0.91% by mass of Ce, 7.7-12.5% by mass of Al, 16.4-25.8% by mass of Ga, and 24.7-27.4% by mass of O.

In the above polycrystalline scintillator for detecting soft X-rays, the amount of Fe is preferably 0.05-0.4 ppm by mass by outer percentage, and the amount of Si is preferably 0.5-5 ppm by mass by outer percentage.

The above polycrystalline scintillator for detecting soft X-rays preferably further contains 10-500 ppm by mass of B by outer percentage.

In the polycrystalline scintillator for detecting soft X-rays according to the present invention, part of Gd or Y may be substituted by a trace amount of Lu, and part of Al or Ga may be substituted by a trace amount of Sc. Because Lu is an element having a large atomic weight, a larger amount of Lu provides a smaller $\mu_{50}/\mu_{100}$ ratio. Accordingly, the amount of Lu is preferably as small as possible. Specifically, the amount of Lu is preferably 0-7.8% by mass, more preferably 0-0.8% by mass. Because Sc is an extremely expensive element, the amount of Sc is preferably as small as possible from the aspect of production cost. Specifically, the amount of Sc is preferably 0-3.2% by mass.

The polycrystalline scintillator for detecting soft X-rays according to the present invention is produced by mixing yttrium oxide powder, gadolinium oxide powder, aluminum oxide powder, gallium oxide powder, and cerium oxide or nitrate powder as starting materials by a ball mill to an average particle size of 0.2-0.7 μm.

The mixed material powders are compression-molded without calcination, and sintered at a temperature of 1650-1720° C. in oxygen to obtain a sintered body having an average crystal grain size of 2-20 μm.

DESCRIPTION OF THE PREFERRED EMBODIMENTS

Figure 2:
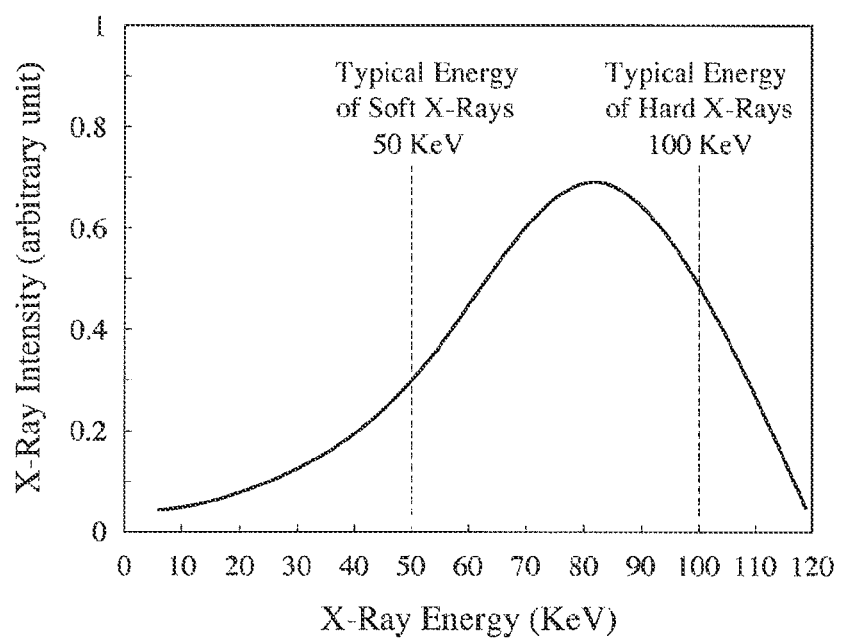
FIG. 2 is a graph showing one example of X-ray spectra at X-ray tube voltage of 120 kV.

In medical X-ray CT, the X-ray tube voltage is generally 120-140 kV. When the X-ray tube voltage is 120 kV, X-rays at 120 keV have the largest energy, and X-rays at about 80 keV have the highest intensity, as shown in FIG. 2. Assuming that the typical energy of soft X-rays is 50 keV, and that the typical energy of hard X-rays is 100 keV, the soft X-ray absorption of the scintillator (a ratio of an absorption coefficient of soft X-rays to an absorption coefficient of hard X-rays) can be represented by a ratio of $\mu_{50}/\mu_{100}$, wherein $\mu_{50}$ is an X-ray absorption coefficient at 50 keV, and $\mu_{100}$ is an X-ray absorption coefficient at 100 keV.

Figure 3:
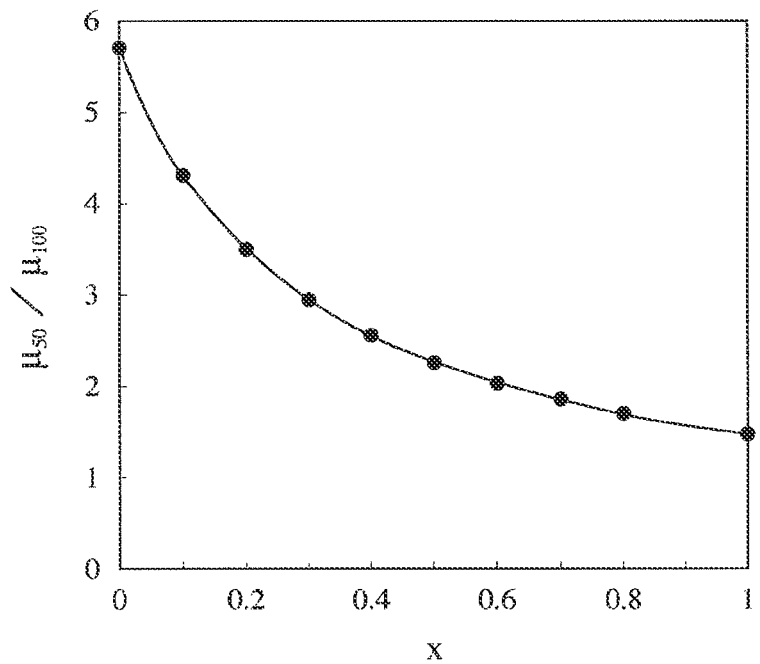
FIG. 3 is a graph showing the relation between x and $\mu_{50}/\mu_{100}$ in a scintillator having a composition of $(Y_{1-x-z}Gd_xCe_z)_{3+a}(Al_{1-u}Ga_u)_{5-a}O_{12}$, wherein a is constant at 0.01, z is constant at 0.003, and u is constant at 0.45.

The ratio ($\mu_{50}/\mu_{100}$) of the absorption coefficient $\mu_{50}$ of X-rays at 50 keV (soft X-rays) to the absorption coefficient $\mu_{100}$ of X-rays at 100 keV (hard X-rays) depends on the atomic ratio of Gd having the largest atomic weight in the composition of $(Y_{1-x-z}Gd_xCe_z)_{3+a}(Al_{1-u}Ga_u)_{5-a}O_{12}$. In a case where a, z and u are constant at a=0.01, z=0.003, and u=0.45, respectively, the relation between x and $\mu_{50}/\mu_{100}$ is shown in FIG. 3. It is clear from FIG. 3 that as x increases, $\mu_{50}/\mu_{100}$ decreases (the absorption coefficient of soft X-rays decreases relative to that of hard X-rays). To differentiate different-density tissues clearly, the $\mu_{50}/\mu_{100}$ should be 3 or more, and thus x should be 0.3 or less.

Figure 4:
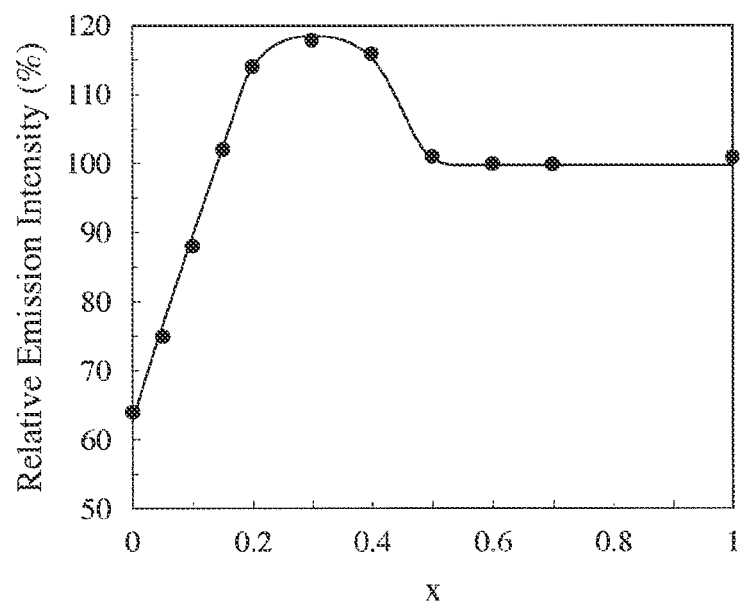
FIG. 4 is a graph showing the relation between x and relative emission intensity in a scintillator having a composition of $(Y_{1-x-z}Gd_xCe_z)_{3+a}(Al_{1-u}Ga_{5-a}O_{12}$, wherein a is constant at 0.01, z is constant at 0.003, and u is constant at 0.45.
Figure 5:
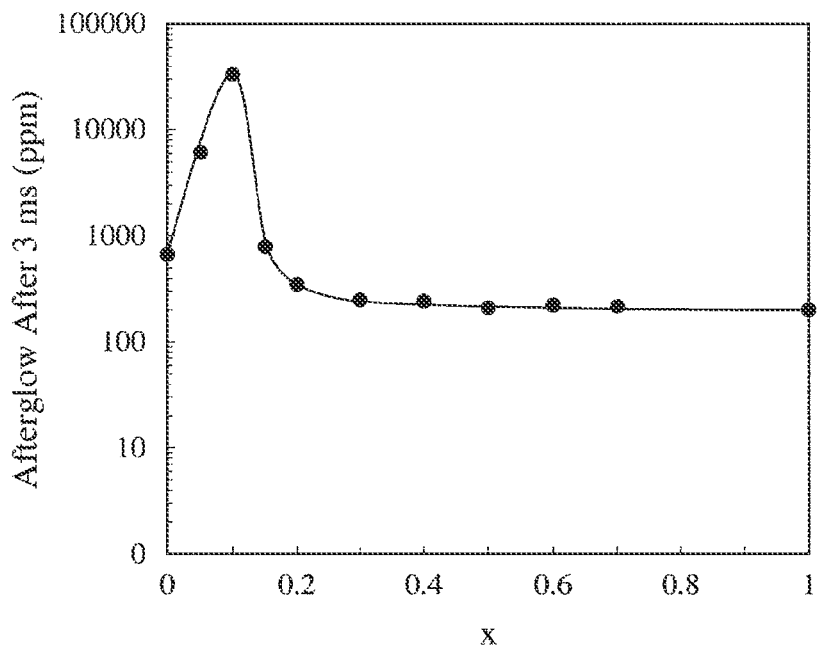
FIG. 5 is a graph showing the relation between x and afterglow after 3 ms in a scintillator having a composition of $(Y_{1-x-z}Gd_xCe_z)_{3+a}(Al_{1-u}Ga_u)_{5-a}O_{12}$, wherein a is constant at 0.01, z is constant at 0.003, and u is constant at 0.45.

In a case where a, z and u are constant at a=0.01, z=0.003, and u=0.45, respectively, in the composition of $(Y_{1-x-z}Gd_xCe_z)_{3+a}(Al_{1-u}Ga_u)_{5-a}O_{12}$, the dependence of relative emission intensity on x is shown in FIG. 4, and the dependence of afterglow after 3 ms on x is shown in FIG. 5. The relative emission intensity is a value when the emission intensity of GOS:Pr, Ce, F is regarded as 100%. The afterglow after 3 ms is expressed by a ratio (unit:ppm) of emission intensity 3 ms after the termination of the irradiation of X-rays to emission intensity during the irradiation of X-rays.

It is clear from FIG. 4 that when x is about 0.15 or more, the emission intensity is more than 100%. It is also clear from FIG. 5 that the afterglow after 3 ms drastically increases when x becomes less than 0.15. These results reveal that the range of x, in which the emission intensity exceeds 100% with the afterglow after 3 ms on a permissible level of 800 ppm or less, is 0.15 or more.

Thus, the range of x, in which $\mu_{50}/\mu_{100}$ is 3 or more, the emission intensity is 100% or more, and the afterglow after 3 ms is 800 ppm or less, is 0.15-0.3. The preferred range of x is 0.16-0.26.

The light emission of a scintillator occurs when electrons and holes generated by X-ray excitement are coupled at light-emitting ions ($Ce^{3+}$). On the other hand, the afterglow occurs when electrons and holes are temporally captured by crystal defects, etc., released by thermal excitement, and re-coupled at light-emitting ions. A polycrystalline scintillator having a garnet structure has eight coordination sites mainly occupied by rare earth ions, and six coordination sites and four coordination sites mainly occupied by $Al^{3+}$ and $Ga^{3+}$. When eight coordination sites occupied by the light-emitting ions ($Ce^{3+}$ ions) have vacancy, electrons generated by the X-ray excitement are captured by them, resulting in increased afterglow. With $0 \le a$, the formation of vacancy is suppressed, resulting in high emission intensity and low afterglow. On the other hand, when a is too large, a perovskite phase (other phase) different from the garnet structure, such as $YAlO_3$, etc., is likely formed in the scintillator. Because this other phase has a different refractive index from that of the garnet matrix phase, light scattering occurs in the perovskite phase, resulting in low light transmittance at emission wavelength, and thus providing the scintillator with low emission intensity.

Figure 6:
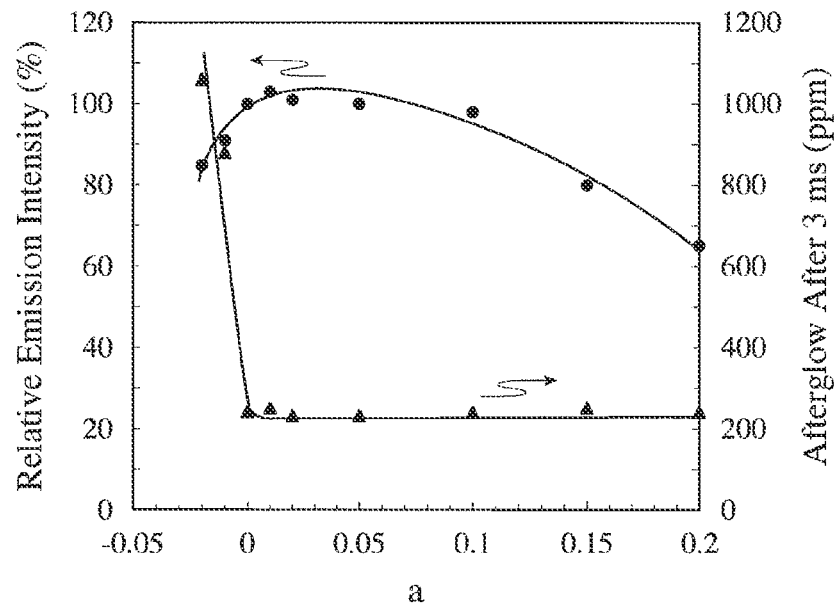
FIG. 6 is a graph showing the relation between a and relative emission intensity and afterglow after 3 ms in a scintillator having a composition of $(Y_{1-x-z}Gd_xCe_z)_{3+a}(Al_{1-u}Ga_u)_{5-a}O_{12}$.

With respect to the composition of $(Y_{1-x-z}Gd_xCe_z)_{3+a}(Al_{1-u}Ga_u)_{5-a}O_{12}$, wherein x, z and u are constant at x=0.3, z=0.003, and u=0.45, respectively, the dependence of the relative emission intensity and the afterglow after 3 ms on a are shown in FIG. 6. The relative emission intensity is expressed by a percentage relative to the emission intensity (100%) at a=0.

In the case of a<0, both emission intensity and afterglow are high. When $a \ge 0$, vacancy at eight coordination sites decreases as described above, resulting in drastically reduced afterglow. However, if the material had portions of a<0 by an uneven composition due to uneven production conditions, such portions would emit afterglow, failing to reduce the afterglow sufficiently. Accordingly, the preferred range of a is 0.005 or more. On the other hand, when a exceeds 0.1, the emission intensity gradually decreases. Particularly when a is larger than 0.15, the relative emission intensity is further low due to the generation of a perovskite phase. Accordingly, the upper limit of a capable of reducing the afterglow without lowering the emission intensity is 0.1. As is clear from FIG. 6, to achieve high emission intensity and low afterglow, a is more preferably in a range of 0.005-0.05.

Figure 7:
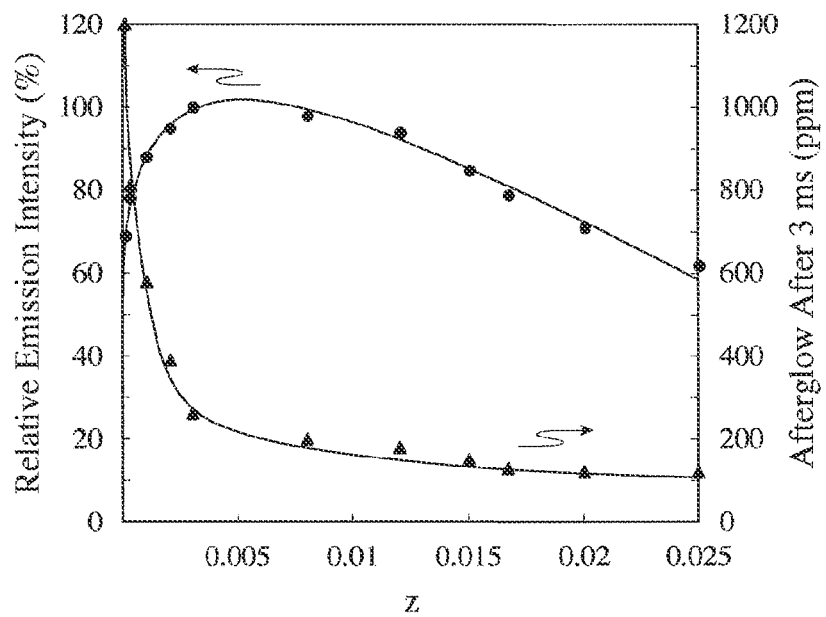
FIG. 7 is a graph showing the relation between z and relative emission intensity and afterglow after 3 ms in a scintillator having a composition of $(Y_{1-x-z}Gd_xCe_z)_{3+a}(Al_{1-u}Ga_u)_{5-a}O_{12}$.

The symbol "z" represents the amount of Ce, a light-emitting element. In the composition of $(Y_{1-x-z}Gd_xCe_z)_{3+a}(Al_{1-u}Ga_u)_{5-a}O_{12}$, wherein a, x and u are constant at a=0.01, x=0.3, and u=0.45, respectively, the dependence of relative emission intensity and afterglow after 3 ms on z (Ce content) is shown in FIG. 7. The relative emission intensity is an emission intensity (%) when the maximum emission intensity (at z=0.003) is 100%. As is clear from FIG. 7, a large relative emission intensity is obtained in a range of $0.002 \le z \le 0.015$. When z is less than 0.002, the number of light-emitting elements (Ce) is too small, so that the energy of absorbed X-rays cannot be converted to light energy efficiently. Also, as is clear from FIG. 7, when z is less than 0.002, the afterglow is drastically high. On the other hand, when z is more than 0.015, the distance between Ce atoms is too small, causing energy transfer (so-called concentration quenching), and thus resulting in a relative emission intensity of less than 90%.

Figure 8:
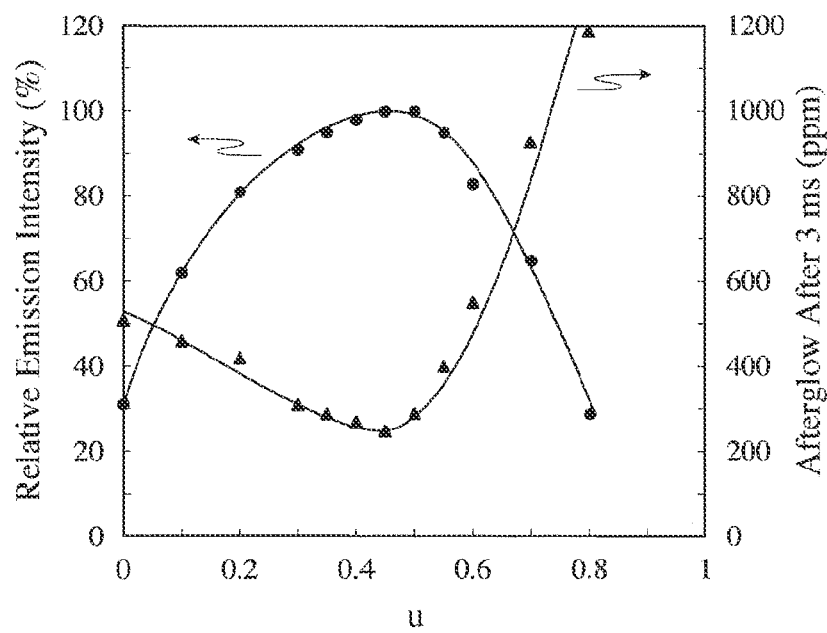
FIG. 8 is a graph showing the relation between u and relative emission intensity and afterglow after 3 ms in a scintillator having a composition of $(Y_{1-x-z}Gd_xCe_z)_{3+a}(Al_{1-u}Ga_u)_{5-a}O_{12}$.

The symbol "u" represents a composition ratio of Al to Ga. In the composition of $(Y_{1-x-z}Gd_xCe_z)_{3+a}(Al_{1-u}Ga_u)_{5-a}O_{12}$, wherein a, x and z are constant at a=0.01, x=0.3, and z=0.003, respectively, the dependence of relative emission intensity and afterglow after 3 ms on u is shown in FIG. 8. The relative emission intensity is an emission intensity (%) when the maximum emission intensity (at u=0.5) is 100%. As is clear from FIG. 8, a range of $0.35 \le u \le 0.55$ provides a large relative emission intensity. The maximum relative emission intensity is obtained at u of 0.48. When u is less than 0.2 or more than 0.6, the relative emission intensity is drastically low, resulting in increased afterglow.

The scintillator of the present invention inevitably contains Fe and Si, and the Fe content should be controlled in a range of 0.05-1 ppm by mass, and the Si content should be controlled in a range of 0.5-10 ppm by mass.

Figure 9:
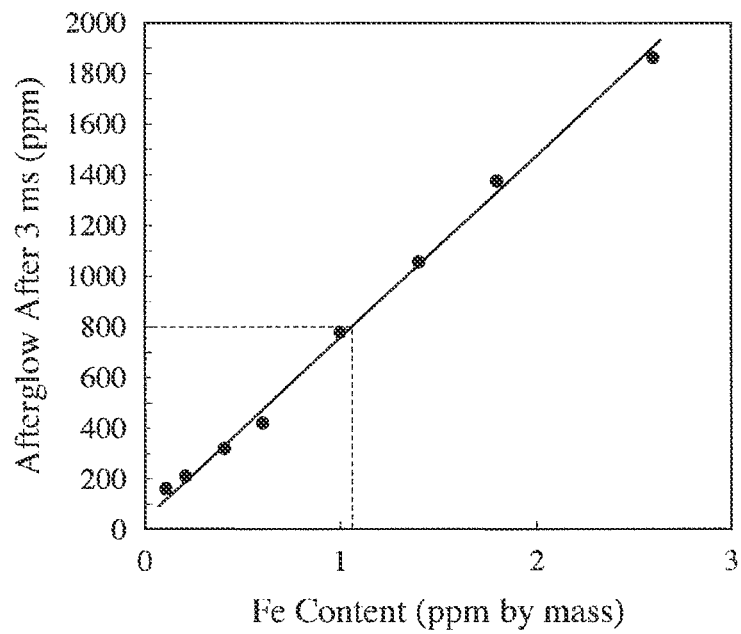
FIG. 9 is a graph showing the relation between the Fe content and afterglow after 3 ms in a scintillator having a composition of $(Y_{1-x-z}Gd_xCe_z)_{3+a}(Al_{1-u}Ga_u)_{5-a}O_{12}$.

The influence of the Fe content on afterglow after 3 ms is shown in FIG. 9. As is clear from FIG. 9, because more than 1 ppm by mass of Fe provides afterglow after 3 ms exceeding 800 ppm, a permissible level, the upper limit of the Fe content is 1 ppm by mass, preferably 0.4 ppm by mass. Because starting material powders (particularly $Al_2O_3$ powder) used for the synthesis of the scintillator contain 1-20 ppm by mass of Fe, the resultant scintillator inevitably contains Fe. To reduce the Fe content in the starting material powders, for example, the starting material powders are heat-treated in vacuum. However, a high-temperature heat treatment in vacuum for reducing the Fe content in the starting material powders to less than 0.05 ppm by mass turns the starting material powders to hard aggregates, making a pulverization treatment necessary. The pulverization treatment inevitably introduces Fe into the starting material powders. Accordingly, the lower limit of the Fe content is practically 0.05 ppm by mass.

Figure 10:
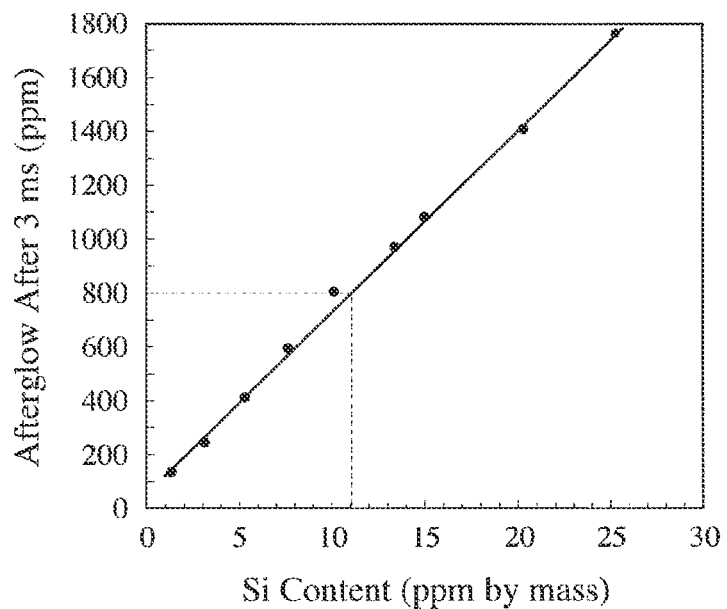
FIG. 10 is a graph showing the relation between the Si content and afterglow after 3 ms in a scintillator having a composition of $(Y_{1-x-z}Gd_xCe_z)_{3+a}(Al_{1-u}Ga_u)_{5-a}O_{12}$.

The influence of the Si content on afterglow after 3 ms is shown in FIG. 10. As is clear from FIG. 10, when the Si content exceeds 10 ppm by mass, the afterglow after 3 ms exceeds 800 ppm, a permissible level. Accordingly, the upper limit of the Si content is 10 ppm by mass, preferably 5 ppm by mass. However, because starting material powders (particularly $Al_2O_3$ powder) used for the synthesis of the scintillator contain 10-40 ppm by mass of Si, the resultant scintillator inevitably contains Si. The Si content in the starting material powders can be reduced, for example, by a heat treatment in vacuum, but the heat treatment in vacuum causes grain growth and turns the starting material powders to hard aggregates, making pulverization with a ball mill necessary. When alumina balls inevitably containing 10-500 ppm by mass of Si are used in ball mill pulverization, Si is inevitably introduced into the starting material powders, so that the Si content increases. Accordingly, the lower limit of the Si content is practically 0.5 ppm by mass.

Figure 11:
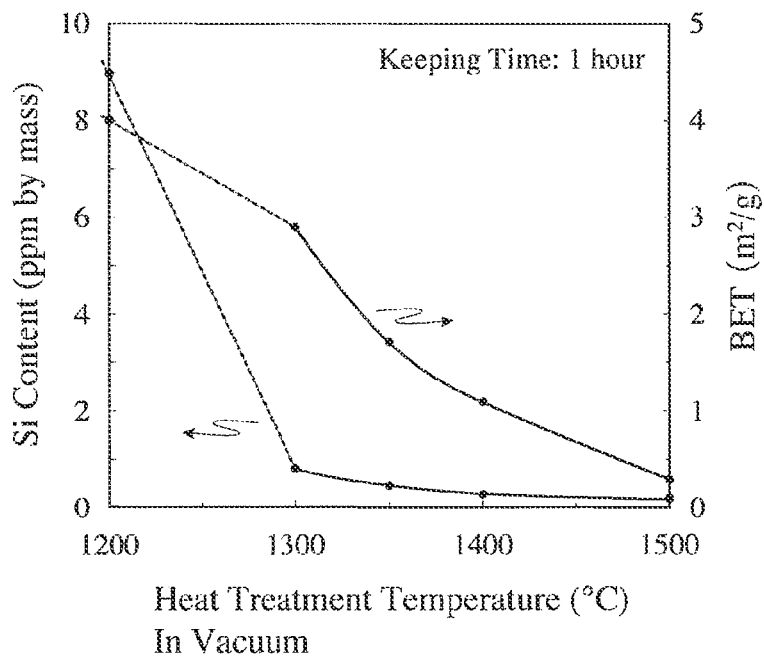
FIG. 11 is a graph showing the relation between the heat treatment temperature of $Al_2O_3$ powder in vacuum and the Si content and a BET value.
Figure 12:
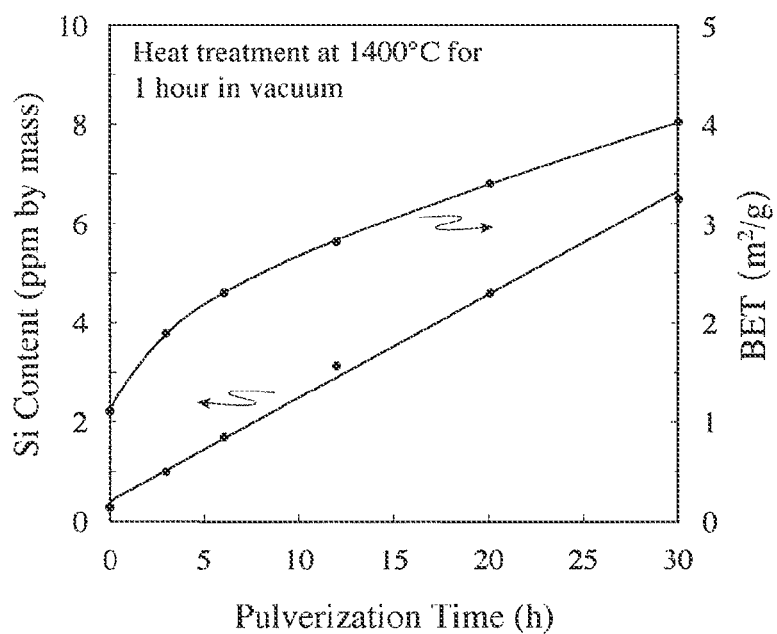
FIG. 12 is a graph showing the relation between the pulverization time of $Al_2O_3$ powder heat-treated at 1400° C. in vacuum and the Si content and a BET value.

The relations between a heat treatment temperature and the Si content and a BET value in the heat treatment of $Al_2O_3$ powder in vacuum are shown in FIG. 11. As the heat treatment temperature elevates, the Si content decreases, and the BET value decreases because of grain growth. Therefore, the starting material powders should be pulverized after heat treatment in vacuum. However, pulverization with alumina balls introduces Si. When $Al_2O_3$ powder heat-treated in vacuum at a temperature of 1400° C., at which the Si content can be reduced most, is pulverized with alumina balls, the relations between the pulverization time and the Si content in the $Al_2O_3$ powder and the BET value of the $Al_2O_3$ powder are shown in FIG. 12. As the pulverization time increases, the BET value increases, and the Si content also increases. To obtain a uniform sintered body free from abnormal grain growth, the starting material powders should have a BET value of 2 m²/g or more. Accordingly, the lower limit of the Si content is 0.5 ppm by mass for industrial mass production. To have the Si content of 10 ppm by mass or less and the BET value of 2 m²/g or more, the temperature of heat treatment in vacuum is preferably 1300-1500° C., and the pulverization time is preferably 5-30 hours.

The scintillator of the present invention is obtained by sintering at a temperature lower than the melting points of the starting material powders. The polycrystalline scintillator is poorer in light transmittance than a single-crystal scintillator having the same composition, but it does not need a long period of time for crystal growth unlike the single-crystal scintillator, resulting in high production efficiency and thus excellent industrial mass productivity.

Because increase in the atomic ratio of $Y^{3+}$ in the scintillator elevates the optimum sintering temperature, a sufficient sintering density cannot be obtained without a sufficiently high sintering temperature, resulting in a large number of pores and a low emission intensity. The investigation of sintering aids lowering the optimum sintering temperature has revealed that sintering aids for lowering sintering temperatures without affecting the emission intensity and the afterglow are preferably B compounds such as $B_2O_3$, $H_3BO_3$, etc. Because B has conventionally been considered as a component lowering the emission intensity, the B content has been made as small as possible to zero. It has been found, however, that a B compound may be used as a sintering aid as long as the B content is preferably 10-500 ppm by mass, more preferably 10-100 ppm by mass. When the B content is more than 500 ppm, large crystal grains are formed, and pores increase in the scintillator, resulting in lower light transmittance. The addition of an optimum amount of the B compound as a sintering aid reduces the optimum sintering temperature by about 25-100° C.

As starting materials for producing the scintillator of the present invention, yttrium oxide, gadolinium oxide, aluminum oxide and gallium oxide are preferable because their high-purity starting materials are easily available at low cost. Preferable as starting materials of $Ce^{3+}$, light-emitting ions, are cerium oxide or uniformly dispersible cerium nitrate. These starting materials are mixed by a ball mill using alumina balls. The pulverized powder preferably has an average particle size of 0.2-0.7 μm. When the average particle size is less than 0.2 μm, a compressed green body does not have a sufficiently increased density, making the density of a sintered body too low and the mixing time too long, thereby increasing the amounts of impurities introduced into the powder from alumina balls. On the other hand, when the average particle size is more than 0.7 μm, the sintered body has too low a density and a less uniform composition, resulting in the unevenness of properties.

In the production of the scintillator of the present invention, a calcining step usual for the production of ceramics is not conducted, because calcining provides hard garnet crystal powder having Vickers hardness Hv of more than 1200, so that more impurities are introduced into the powder from alumina balls during pulverization. The compression-molding may be monoaxial compression-molding or a combination of monoaxial compression-molding and cold isostatic pressing. The sintering is preferably conducted in oxygen, because gallium components are easily reduced. The sintered body preferably has a particle size of 2-20 μm. When the average particle size is less than 2 μm, sintering does not proceed sufficiently, resulting in pores in crystal grain boundaries. When the average particle size is more than 20 μm, sintering proceeds too much, resulting in voids in crystal grains, and thus providing the sintered body with a low density. The sintering temperature providing an average particle size of 2-20 μm is 1650-1720° C.

The present invention will be explained in more detail referring to Examples below without intention of restriction.

Example 1

Taking into consideration the contamination of $Al_2O_3$ from alumina balls, 200 g in total of starting material powders comprising 73.79 g of $Y_2O_3$ powder, 29.80 g of $Gd_2O_3$ powder, 0.77 g of $CeO_2$ powder, 38.16 g of $Al_2O_3$ powder, and 57.48 g of $Ga_2O_3$ powder were charged, together with 1300 g of high-purity alumina balls each having a diameter of 5 mm and 200 cc of ethanol, into a 1-litter-volume resin pot. To reduce the amounts of Fe and Si contained, the $Al_2O_3$ powder was heat-treated at 1400° C. for 1 hour in vacuum (10 Pa or less), and then pulverized by a ball mill for 12 hours in advance. The starting material powders were wet-ball-milled for 12 hours, and then dried. The mass change of the alumina balls after wet ball milling was 0.06 g. The average particle size of the wet-ball-milled powder, which was measured by a laser-diffraction particle size distribution analyzer (LA920 available from HORIBA, Ltd.) assuming that water had an average refractive index of 1.5, was 0.5 μm.

The pulverized powder was monoaxially press-molded under pressure of 500 kg/cm², and then subject to cold isostatic pressing under pressure of 3 ton/cm², to obtain a green body having a relative density of 54%. This green body was placed in an alumina sagger, and sintered at 1700° C. for 12 hours in oxygen to obtain a sintered body having a relative density of 99.9%. This sintered body was cut to plates of 1 mm in width, 30 mm in length and 2.5 mm in thickness by an inner-edge slicer, and each plate was optically surface-polished, and then heated to 1300° C. to etch grain boundaries. The average crystal grain size measured by a code method, which is a method for determining an average grain size from the number of intersections of boundaries per a unit length of a straight line arbitrarily drawn on a photograph of the structure, was 8 μm.

The amounts of main components and B were measured by inductively coupled plasma atomic emission spectroscopy (ICP-AES) using OPTIMA-3300XL available from PerkinElmer, and the amounts of Fe and Si were measured by glow discharge mass spectrometry (GDMS) using VG9000 available from VG Elemental. The measurement results are shown in Table 2.

Figure 1:
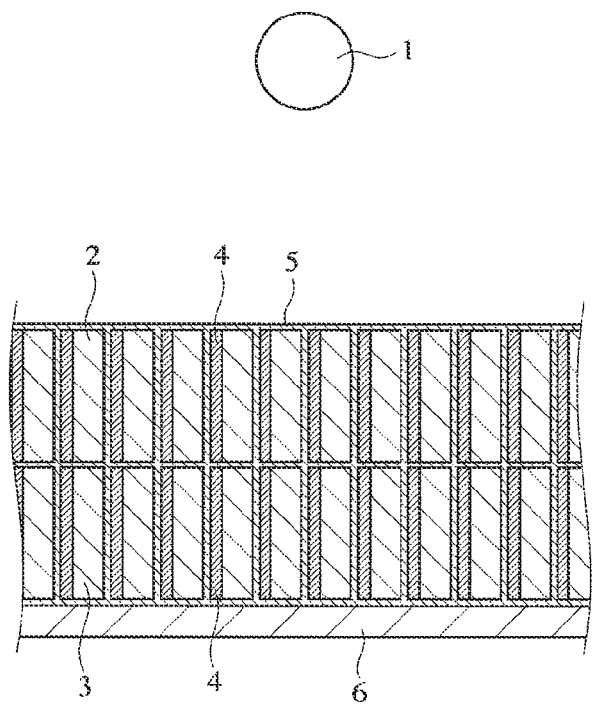
FIG. 1 is a schematic view showing the structure of one example of radiation detectors.

Using this scintillator sample, the radiation detector shown in FIG. 1 was produced. In this radiation detector, each scintillator 2 excited by the irradiation of X-rays from an X-ray source 1 emits light, which is detected by each silicon photodiode 4, making it possible to know the characteristics of the scintillator. An electrical signal amplifier for converting the current output of the silicon photodiode to voltage and amplifying the voltage was connected to the circuit board 6, constituting a signal amplifier for converting X-rays to visible light.

Example 2

The polycrystalline scintillator of Example 2 having a composition shown in Table 2 was produced in the same manner as in Example 1, except for using starting material powders comprising 73.61 g of $Y_2O_3$ powder, 29.73 g of $Gd_2O_3$ powder, 0.706 g of $CeO_2$ powder, 38.26 g of $Al_2O_3$ powder, and 57.64 g of $Ga_2O_3$ powder.

Example 3

The polycrystalline scintillator of Example 3 having a composition shown in Table 2 was produced in the same manner as in Example 1, except for using starting material powders comprising 75.47 g of $Y_2O_3$ powder, 30.48 g of $Gd_2O_3$ powder, 0.724 g of $CeO_2$ powder, 37.21 g of $Al_2O_3$ powder, and 56.05 g of $Ga_2O_3$ powder.

Example 4

The polycrystalline scintillator of Example 4 having a composition shown in Table 2 was produced in the same manner as in Example 1, except for using starting material powders comprising 79.55 g of $Y_2O_3$ powder, 22.67 g of $Gd_2O_3$ powder, 0.718 g of $CeO_2$ powder, 38.70 g of $Al_2O_3$ powder, and 58.30 g of $Ga_2O_3$ powder.

Example 5

The polycrystalline scintillator of Example 5 having a composition shown in Table 2 was produced in the same manner as in Example 1, except for using starting material powders comprising 62.75 g of $Y_2O_3$ powder, 43.48 g of $Gd_2O_3$ powder, 0.688 g of $CeO_2$ powder, 37.11 g of $Al_2O_3$ powder, and 55.91 g of $Ga_2O_3$ powder.

Example 6

The polycrystalline scintillator of Example 6 having a composition shown in Table 2 was produced in the same manner as in Example 1, except for using starting material powders comprising 74.13 g of $Y_2O_3$ powder, 29.82 g of $Gd_2O_3$ powder, 0.283 g of $CeO_2$ powder, 38.18 g of $Al_2O_3$ powder, and 57.52 g of $Ga_2O_3$ powder.

Example 7

The polycrystalline scintillator of Example 7 having a composition shown in Table 2 was produced in the same manner as in Example 1, except for using starting material powders comprising 72.69 g of $Y_2O_3$ powder, 29.73 g of $Gd_2O_3$ powder, 2.117 g of $CeO_2$ powder, 38.06 g of $Al_2O_3$ powder, and 57.34 g of $Ga_2O_3$ powder.

Example 8

The polycrystalline scintillator of Example 8 having a composition shown in Table 2 was produced in the same manner as in Example 1, except for using starting material powders comprising 76.01 g of $Y_2O_3$ powder, 30.70 g of $Gd_2O_3$ powder, 0.729 g of $CeO_2$ powder, 46.46 g of $Al_2O_3$ powder, and 46.05 g of $Ga_2O_3$ powder.

Example 9

The polycrystalline scintillator of Example 9 having a composition shown in Table 2 was produced in the same manner as in Example 1, except for using starting material powders comprising 71.71 g of $Y_2O_3$ powder, 28.96 g of $Gd_2O_3$ powder, 0.687 g of $CeO_2$ powder, 30.38 g of $Al_2O_3$ powder, and 68.27 g of $Ga_2O_3$ powder.

Example 10

The polycrystalline scintillator of Example 10 having a composition shown in Table 2 was produced in the same manner as in Example 1, except for using starting material powders comprising 79.55 g of $Y_2O_3$ powder, 22.67 g of $Gd_2O_3$ powder, 0.718 g of $CeO_2$ powder, 38.70 g of $Al_2O_3$ powder, and 58.30 g of $Ga_2O_3$ powder, together with 0.3 g of $B_2O_3$ powder as a sintering aid, and changing the sintering temperature to 1600° C.

Example 11

The polycrystalline scintillator of Example 11 having a composition shown in Table 2 was produced in the same manner as in Example 1, except for using starting material powders comprising 62.75 g of $Y_2O_3$ powder, 43.48 g of $Gd_2O_3$ powder, 0.688 g of $CeO_2$ powder, 37.11 g of $Al_2O_3$ powder, and 55.91 g of $Ga_2O_3$ powder, together with 0.1 g of $H_3BO_3$ powder as a sintering aid.

Example 12

The polycrystalline scintillator having a composition shown in Table 2 and an average crystal grain size of 2 μm was produced in the same manner as in Example 1, except for using starting material powders comprising 73.79 g of $Y_2O_3$ powder, 29.80 g of $Gd_2O_3$ powder, 0.77 g of $CeO_2$ powder, 38.16 g of $Al_2O_3$ powder, and 57.48 g of $Ga_2O_3$ powder, and having an average particle size of 0.2 μm, and changing the ball-milling time to 60 hours.

Example 13

The polycrystalline scintillator having a composition shown in Table 2 and an average crystal grain size of 19 μm was produced in the same manner as in Example 1, except for using starting material powders comprising 73.79 g of $Y_2O_3$ powder, 29.80 g of $Gd_2O_3$ powder, 0.77 g of $CeO_2$ powder, 38.16 g of $Al_2O_3$ powder, and 57.48 g of $Ga_2O_3$ powder, and having an average particle size of 0.7 μm, and changing the ball-milling time to 8 hours and the sintering conditions to 1720° C. for 24 hours.

Comparative Example 1

The polycrystalline scintillator of Comparative Example 1 having a composition shown in Table 2 was produced in the same manner as in Example 1, except for using starting material powders comprising 54.28 g of $Y_2O_3$ powder, 58.58 g of $Gd_2O_3$ powder, 0.695 g of $CeO_2$ powder, 34.46 g of $Al_2O_3$ (not heat-treated in vacuum), and 51.92 g of $Ga_2O_3$ powder. The scintillator of Comparative Example 1 had small emission intensity because a was as large as 0.17, and large afterglow because of large Fe and Si contents.

Comparative Example 2

The polycrystalline scintillator of Comparative Example 2 having a composition shown in Table 2 was produced in the same manner as in Comparative Example 1, except for using starting material powders comprising 52.11 g of $Y_2O_3$ powder, 56.05 g of $Gd_2O_3$ powder, 0.399 g of $CeO_2$ powder, 36.46 g of $Al_2O_3$ powder, and 54.93 g of $Ga_2O_3$ powder.

Comparative Example 3

The polycrystalline scintillator of Comparative Example 3 having a composition shown in Table 2 was produced in the same manner as in Comparative Example 1, except for using starting material powders comprising 55.26 g of $Y_2O_3$ powder, 47.99 g of $Gd_2O_3$ powder, 0.391 g of $CeO_2$ powder, 25.58 g of $Al_2O_3$ powder, and 70.71 g of $Ga_2O_3$ powder.

Comparative Example 4

The polycrystalline scintillator of Comparative Example 4 having a composition shown in Table 2 was produced in the same manner as in Comparative Example 1, except for using starting material powders comprising 25.78 g of $Y_2O_3$ powder, 97.54 g of $Gd_2O_3$ powder, 0.397 g of $CeO_2$ powder, 52.20 g of $Al_2O_3$ powder, and 24.02 g of $Ga_2O_3$ powder. The scintillator of Comparative Example 4 had $\mu_{50}/\mu_{100}$ as considerably small as 1.73 because x was as large as 0.7, and small emission intensity because u was as small as 0.2.

Comparative Example 5

The polycrystalline scintillator of Comparative Example 5 having a composition shown in Table 2 was produced in the same manner as in Comparative Example 1, except for using starting material powders comprising 42.83 g of $Y_2O_3$ powder, 68.79 g of $Gd_2O_3$ powder, 0.026 g of $CeO_2$ powder, 35.22 g of $Al_2O_3$ powder, and 53.07 g of $Ga_2O_3$ powder. The scintillator of Comparative Example 5 had small emission intensity because z was as small as 0.0002.

Comparative Example 6

The polycrystalline scintillator of Comparative Example 6 having a composition shown in Table 2 was produced in the same manner as in Comparative Example 1, except for using starting material powders comprising 40.36 g of $Y_2O_3$ powder, 67.50 g of $Gd_2O_3$ powder, 2.564 g of $CeO_2$ powder, 31.50 g of $Al_2O_3$ powder, and 58.02 g of $Ga_2O_3$ powder. The scintillator of Comparative Example 6 had small emission intensity because z was as large as 0.02.

Comparative Example 7

The polycrystalline scintillator of Comparative Example 7 having a composition shown in Table 2 was produced in the same manner as in Comparative Example 1, except for using starting material powders comprising 7.14 g of $Y_2O_3$ powder, 108.61 g of $Gd_2O_3$ powder, 0.573 g of $CeO_2$ powder, 22.21 g of $Al_2O_3$ powder, and 61.41 g of $Ga_2O_3$ powder. The scintillator of Comparative Example 7 had $\mu_{50}/\mu_{100}$ as considerably small as 1.68 because x was as large as 0.9.

Comparative Example 8

The polycrystalline scintillator of Comparative Example 8 having a composition shown in Table 2 was produced in the same manner as in Comparative Example 1, except for using starting material powders comprising 47.21 g of $Y_2O_3$ powder, 62.58 g of $Gd_2O_3$ powder, 0.66 g of $CeO_2$ powder, 35.70 g of $Al_2O_3$ powder, and 53.79 g of $Ga_2O_3$ powder, together with 0.2 g of MgO powder as a sintering aid. The scintillator of Comparative Example 8 had emission intensity drastically decreased by Mg in the sintering aid.

Comparative Example 9

The polycrystalline scintillator of Comparative Example 9 having a composition shown in Table 2 was produced in the same manner as in Comparative Example 1, except for using starting material powders comprising 47.21 g of $Y_2O_3$ powder, 62.58 g of $Gd_2O_3$ powder, 0.66 g of $CeO_2$ powder, 35.70 g of $Al_2O_3$ powder, and 53.79 g of $Ga_2O_3$ powder, together with 0.2 g of $SiO_2$ powder as a sintering aid. The scintillator of Comparative Example 9 had afterglow drastically increased by Si in the sintering aid.

Comparative Example 10

The polycrystalline scintillator having a composition shown in Table 2 and an average crystal grain size of 1.5 μm was produced in the same manner as in Example 1, except for using starting material powders comprising 73.79 g of $Y_2O_3$ powder, 29.80 g of $Gd_2O_3$ powder, 0.77 g of $CeO_2$ powder, 38.16 g of $Al_2O_3$ powder, and 57.48 g of $Ga_2O_3$ powder, and having an average particle size of 0.1 μm, and changing the ball-milling time to 120 hours.

Comparative Example 11

The polycrystalline scintillator having a composition shown in Table 2 and an average crystal grain size of 25 μm was produced in the same manner as in Example 1, except for using starting material powders comprising 73.79 g of $Y_2O_3$ powder, 29.80 g of $Gd_2O_3$ powder, 0.77 g of $CeO_2$ powder, 38.16 g of $Al_2O_3$ powder, and 57.48 g of $Ga_2O_3$ powder, and having an average particle size of 0.9 μm, and changing the ball-milling time to 6 hours and the sintering conditions to 1720° C. for 24 hours.

Using an X-ray tube having a tungsten target as an X-ray source in the radiation detector in Example 1, each scintillator in the radiation detector was irradiated with X-rays under the conditions of X-ray tube voltage of 120 kV and X-ray tube current of 20 mA, to measure the emission intensity and afterglow after 3 ms of each scintillator sample of Examples 1-13 and Comparative Examples 1-11. The emission intensity is expressed by a relative emission intensity, assuming that the emission intensity of the GOS:Pr, Ce, F scintillator shown in Table 1 is 100%. $\mu_{50}/\mu_{100}$ was obtained by calculation from the composition shown in Table 3. The results are shown in Table 4.

Table 2 shows the measured amounts of elements in the polycrystalline scintillators of Examples 1-13 and Comparative Examples 1-11, and Table 3 shows their chemical formulae determined from the measured values. The scintillators of Examples 1-13 had emission intensity of 100% or more and afterglow after 3 ms of 800 ppm or less, while the scintillators of Comparative Examples 1-11 had emission intensity of less than 100% and afterglow after 3 ms considerably larger than 800 ppm. Particularly the scintillator of Comparative Example 8 had small afterglow after 3 ms because of Mg in the sintering aid, but it had also low emission intensity. The scintillator of Comparative Example 9 had drastically increased afterglow after 3 ms because of Si in the sintering aid.

TABLE 2

| No. | Composition (by mass) of Scintillator | | | | | | | |
|---|---|---|---|---|---|---|---|---|
| | Y (%) | Gd (%) | Ce (%) | Al (%) | Ga (%) | O (%) | Fe[(1)] (ppm) | Si[(1)] (ppm) |
| Example 1 | 29.1 | 12.9 | 0.288 | 10.1 | 21.4 | 26.212 | 0.2 | 2 |
| Example 2 | 29.0 | 12.9 | 0.287 | 10.1 | 21.4 | 26.313 | 0.3 | 4 |
| Example 3 | 29.7 | 13.2 | 0.295 | 9.9 | 20.9 | 26.005 | 0.4 | 5 |
| Example 4 | 31.3 | 9.8 | 0.292 | 10.3 | 21.7 | 26.608 | 0.4 | 4 |
| Example 5 | 24.7 | 18.9 | 0.280 | 9.8 | 20.8 | 25.52 | 0.4 | 5 |
| Example 6 | 29.2 | 12.9 | 0.115 | 10.1 | 21.4 | 26.285 | 0.4 | 3 |
| Example 7 | 28.6 | 12.9 | 0.862 | 10.1 | 21.3 | 26.238 | 0.2 | 5 |
| Example 8 | 29.9 | 13.3 | 0.297 | 12.3 | 17.1 | 27.103 | 0.1 | 1 |
| Example 9 | 28.2 | 12.6 | 0.280 | 8.0 | 25.4 | 25.52 | 0.2 | 4 |
| Example 10 | 31.3 | 9.8 | 0.292 | 10.3 | 21.7 | 26.608 | 0.2 | 4 |
| Example 11 | 24.7 | 18.9 | 0.280 | 9.8 | 20.8 | 25.52 | 0.4 | 5 |
| Example 12 | 29.1 | 12.9 | 0.288 | 10.1 | 21.4 | 26.212 | 0.4 | 7 |
| Example 13 | 29.1 | 12.9 | 0.288 | 10.1 | 21.4 | 26.212 | 0.3 | 3 |
| Comp. Ex. 1 | 21.4 | 25.4 | 0.283 | 9.1 | 19.3 | 24.517 | 1.3 | 15 |
| Comp. Ex. 2 | 20.5 | 24.3 | 0.162 | 9.7 | 20.4 | 24.938 | 1.8 | 13 |
| Comp. Ex. 3 | 21.8 | 20.8 | 0.159 | 6.8 | 26.3 | 24.141 | 1.5 | 9 |
| Comp. Ex. 4 | 10.2 | 42.3 | 0.162 | 13.8 | 8.9 | 24.638 | 1.6 | 12 |
| Comp. Ex. 5 | 16.9 | 29.8 | 0.011 | 9.3 | 19.7 | 24.289 | 1.4 | 15 |
| Comp. Ex. 6 | 15.9 | 29.3 | 1.044 | 8.4 | 21.6 | 23.756 | 1.9 | 17 |
| Comp. Ex. 7 | 2.8 | 47.1 | 0.233 | 5.9 | 22.8 | 21.167 | 1.8 | 14 |
| Comp. Ex. 8 | 18.6 | 27.2 | 0.269 | 9.5 | 20.0 | 24.431 | 1.5 | 15 |
| Comp. Ex. 9 | 18.6 | 27.2 | 0.269 | 9.5 | 20.0 | 24.431 | 1.3 | 440 |
| Comp. Ex. 10 | 29.1 | 12.9 | 0.288 | 10.1 | 21.4 | 26.212 | 1.2 | 13 |
| Comp. Ex. 11 | 29.1 | 12.9 | 0.288 | 10.1 | 21.4 | 26.212 | 0.2 | 3 |

Note:
Outer percentage (by mass).

TABLE 3

| No. | Composition (atomic ratio) of $(Y_{1-x-z}Gd_xCe_z)_{3+a}(Al_{1-u}Ga_u)_{5-a}O_{12}$ | | | | | |
|---|---|---|---|---|---|---|
| | a | x | z | u | Fe[(1)] (ppm) | Si[(1)] (ppm) |
| Example 1 | 0.01 | 0.2 | 0.005 | 0.45 | 0.2 | 2 |
| Example 2 | 0 | 0.2 | 0.005 | 0.45 | 0.3 | 4 |
| Example 3 | 0.1 | 0.2 | 0.005 | 0.45 | 0.4 | 5 |
| Example 4 | 0.01 | 0.15 | 0.005 | 0.45 | 0.4 | 4 |
| Example 5 | 0.01 | 0.3 | 0.005 | 0.45 | 0.4 | 5 |
| Example 6 | 0.01 | 0.2 | 0.002 | 0.45 | 0.4 | 3 |
| Example 7 | 0.01 | 0.2 | 0.015 | 0.45 | 0.2 | 5 |
| Example 8 | 0.01 | 0.2 | 0.005 | 0.35 | 0.1 | 1 |
| Example 9 | 0.01 | 0.2 | 0.005 | 0.55 | 0.2 | 4 |
| Example 10 | 0.01 | 0.15 | 0.005 | 0.45 | 0.2 | 4 |
| Example 11 | 0.01 | 0.3 | 0.005 | 0.45 | 0.4 | 5 |
| Example 12 | 0.01 | 0.2 | 0.005 | 0.45 | 0.4 | 7 |
| Example 13 | 0.01 | 0.2 | 0.005 | 0.45 | 0.3 | 3 |
| Comp. Ex. 1 | 0.17 | 0.4 | 0.005 | 0.45 | 1.3 | 15 |
| Comp. Ex. 2 | −0.02 | 0.4 | 0.003 | 0.45 | 1.8 | 13 |
| Comp. Ex. 3 | 0.005 | 0.35 | 0.003 | 0.6 | 1.5 | 9 |
| Comp. Ex. 4 | 0 | 0.7 | 0.003 | 0.2 | 1.6 | 12 |
| Comp. Ex. 5 | 0.01 | 0.5 | 0.0002 | 0.45 | 1.4 | 15 |
| Comp. Ex. 6 | 0.005 | 0.5 | 0.02 | 0.5 | 1.9 | 17 |
| Comp. Ex. 7 | 0.03 | 0.9 | 0.005 | 0.6 | 1.8 | 14 |
| Comp. Ex. 8 | 0.005 | 0.45 | 0.005 | 0.45 | 1.5 | 15 |
| Comp. Ex. 9 | 0.005 | 0.45 | 0.005 | 0.45 | 1.3 | 440 |
| Comp. Ex. 10 | 0.01 | 0.2 | 0.005 | 0.45 | 1.2 | 13 |
| Comp. Ex. 11 | 0.01 | 0.2 | 0.005 | 0.45 | 0.2 | 3 |

Note:
Outer percentage (by mass).

TABLE 4

| No. | Sintering Aid | B Content (ppm by mass) | $\mu_{50}/\mu_{100}$ | Relative Emission Intensity (%) | Afterglow After 3 ms (ppm) |
|---|---|---|---|---|---|
| Example 1 | — | <1 | 3.53 | 115 | 310 |
| Example 2 | — | <1 | 3.53 | 113 | 330 |
| Example 3 | — | <1 | 3.52 | 114 | 340 |
| Example 4 | — | <1 | 3.90 | 103 | 790 |
| Example 5 | — | <1 | 3.00 | 117 | 251 |
| Example 6 | — | <1 | 3.52 | 104 | 570 |
| Example 7 | — | <1 | 3.56 | 104 | 260 |
| Example 8 | — | <1 | 3.45 | 112 | 390 |
| Example 9 | — | <1 | 3.60 | 107 | 440 |
| Example 10 | $B_2O_3$ | 450 | 3.90 | 103 | 780 |
| Example 11 | $H_3BO_3$ | 80 | 3.00 | 117 | 240 |
| Example 12 | — | <1 | 3.53 | 109 | 520 |
| Example 13 | — | <1 | 3.53 | 103 | 270 |
| Comp. Ex. 1 | — | <1 | 2.57 | 91 | 1110 |
| Comp. Ex. 2 | — | <1 | 2.59 | 92 | 2240 |
| Comp. Ex. 3 | — | <1 | 2.87 | 93 | 1580 |
| Comp. Ex. 4 | — | <1 | 1.73 | 76 | 1290 |
| Comp. Ex. 5 | — | <1 | 2.28 | 72 | 2110 |
| Comp. Ex. 6 | — | <1 | 2.37 | 77 | 1390 |
| Comp. Ex. 7 | — | <1 | 1.68 | 83 | 2150 |
| Comp. Ex. 8 | MgO | <1 | 2.43 | 85 | 190 |
| Comp. Ex. 9 | $SiO_2$ | <1 | 2.43 | 91 | 4270 |
| Comp. Ex. 10 | — | <1 | 3.53 | 95 | 890 |
| Comp. Ex. 11 | — | <1 | 3.53 | 89 | 290 |

EFFECT OF THE INVENTION

Because the soft-X-ray-detecting polycrystalline scintillator of the present invention has a large absorption coefficient of soft X-rays and a small absorption coefficient of hard X-rays, exhibiting large emission intensity and small afterglow, it can be used in X-ray CT apparatuses for detecting low-density tissues such as muscles, blood vessels, etc. of human bodies with high resolution.

What is claimed is:

1. A polycrystalline scintillator for detecting soft X-rays, which comprises Ce as a light-emitting element and at least Y, Gd, Al, Ga and O, and has a garnet crystal structure, said scintillator having a composition represented by the following general formula:

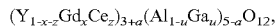
$(Y_{1-x-z}Gd_xCe_z)_{3+a}(Al_{1-u}Ga_u)_{5-a}O_{12}$, wherein $0 \leq a \leq 0.1$, $0.15 \leq x \leq 0.3$, $0.002 \leq z \leq 0.015$, and $0.35 \leq u \leq 0.55$;

said scintillator containing 0.05-1 ppm by mass of Fe and 0.5-10 ppm of Si by outer percentage;

said scintillator having a ratio $\mu_{50}/\mu_{100}$ of 3 or more, wherein $\mu_{50}$ is an absorption coefficient of X-rays at 50 keV, and $\mu_{100}$ is an absorption coefficient of X-rays at 100 keV; and said scintillator having afterglow of 800 ppm or less after 3 ms from the termination of X-ray irradiation.

2. The polycrystalline scintillator for detecting soft X-rays according to claim 1, wherein a in said general formula is 0.005-0.05.

3. The polycrystalline scintillator for detecting soft X-rays according to claim 1, wherein the amount of Fe is 0.05-0.4 ppm by mass by outer percentage.

4. The polycrystalline scintillator for detecting soft X-rays according to claim 1, wherein the amount of Si is 0.5-5 ppm by mass by outer percentage.

5. A polycrystalline scintillator for detecting soft X-rays, which comprises Ce as a light-emitting element and at least Y, Gd, Al, Ga and O, and has a garnet crystal structure, the amount of each element being 23.6-33.1% by mass of Y, 9.5-19.8% by mass of Gd, 0.11-0.92% by mass of Ce, 7.6-12.5% by mass of Al, 16.2-25.8% by mass of Ga, and 24.6-27.5% by mass of O, based on 100% by mass of the total amount, with 0.05-1 ppm by mass of Fe and 0.5-10 ppm by mass of Si by outer percentage;

said scintillator having a ratio $\mu_{50}/\mu_{100}$ of 3 or more, wherein $\mu_{50}$ is an absorption coefficient of X-rays at 50 keV, and $\mu_{100}$ is an absorption coefficient of X-rays at 100 keV; and said scintillator having afterglow of 800 ppm or less after 3 ms from the termination of X-ray irradiation.

6. The polycrystalline scintillator for detecting soft X-rays scintillator according to claim 5, wherein the amount of each element is 23.6-32.7% by mass of Y, 9.5-19.6% by mass of Gd, 0.11-0.91% by mass of Ce, 7.7-12.5% by mass of Al, 16.4-25.8% by mass of Ga, and 24.7-27.4% by mass of O, based on 100% by mass of the total amount, with 0.05-0.4 ppm by mass of Fe and 0.5-5 ppm by mass of Si by outer percentage.

7. The polycrystalline scintillator for detecting soft X-rays according to claim 1, which comprises 10-500 ppm by mass of B by outer percentage.

8. A method for producing the polycrystalline scintillator for detecting soft X-rays recited in claim 1, comprising the step of mixing starting material powders comprising yttrium oxide powder, gadolinium oxide powder, aluminum oxide powder, gallium oxide powder, and cerium oxide or nitrate powder by a ball mill to have an average particle size of 0.2-0.7 μm.

9. The method for producing a polycrystalline scintillator for detecting soft X-rays according to claim 8, wherein the mixed material powders are compression-molded without calcination, and sintered at a temperature of 1650-1720° C. in oxygen to obtain a sintered body having an average crystal grain size of 2-20 μm.

10. The polycrystalline scintillator for detecting soft X-rays according to claim 5, which comprises 10-500 ppm by mass of B by outer percentage.

11. A method for producing the polycrystalline scintillator for detecting soft X-rays recited in claim 5, comprising the step of mixing starting material powders comprising yttrium oxide powder, gadolinium oxide powder, aluminum oxide powder, gallium oxide powder, and cerium oxide or nitrate powder by a ball mill to have an average particle size of 0.2-0.7 μm.

12. The method for producing a polycrystalline scintillator for detecting soft X-rays according to claim 11, wherein the mixed material powders are compression-molded without calcination, and sintered at a temperature of 1650-1720° C. in oxygen to obtain a sintered body having an average crystal grain size of 2-20 μm.

* * * * *